(No Model.)

R. F. STEWART.
SELF PROPELLING VEHICLE.

No. 554,319. Patented Feb. 11, 1896.

Witnesses:—
O. N. Hayward
J. E. Greer

Inventor:—
Richard F. Stewart
by James T. Saw
Attorney (No Model.)   
R. F. STEWART.  
SELF PROPELLING VEHICLE.  
No. 554,319.   
2 Sheets—Sheet 2.  
Patented Feb. 11, 1896.

Witnesses:-
D. N. Hayford
J. E. Greer

Inventor:-
Richard F. Stewart
by James T. Daw
Attorney.

UNITED STATES PATENT OFFICE.

RICHARD F. STEWART, OF MOUNT PLEASANT, NEW YORK.

SELF-PROPELLING VEHICLE.

SPECIFICATION forming part of Letters Patent No. 554,319, dated February 11, 1896.

Application filed February 9, 1895. Serial No. 537,748. (No model.)

*To all whom it may concern:*

Be it known that I, RICHARD F. STEWART, a citizen of the United States, and a resident of Mount Pleasant, in the county of Westchester and State of New York, have invented certain new and useful Improvements in Self-Propelling Vehicles, of which the following is a specification.

My improvement refers to mechanism for controlling and regulating the movements of the vehicle; and it consists especially in a novel construction of gearing by which the motion of the vehicle can be reversed and its speed regulated, and in mechanism attached thereto for operating and controlling the same.

Figure 1:
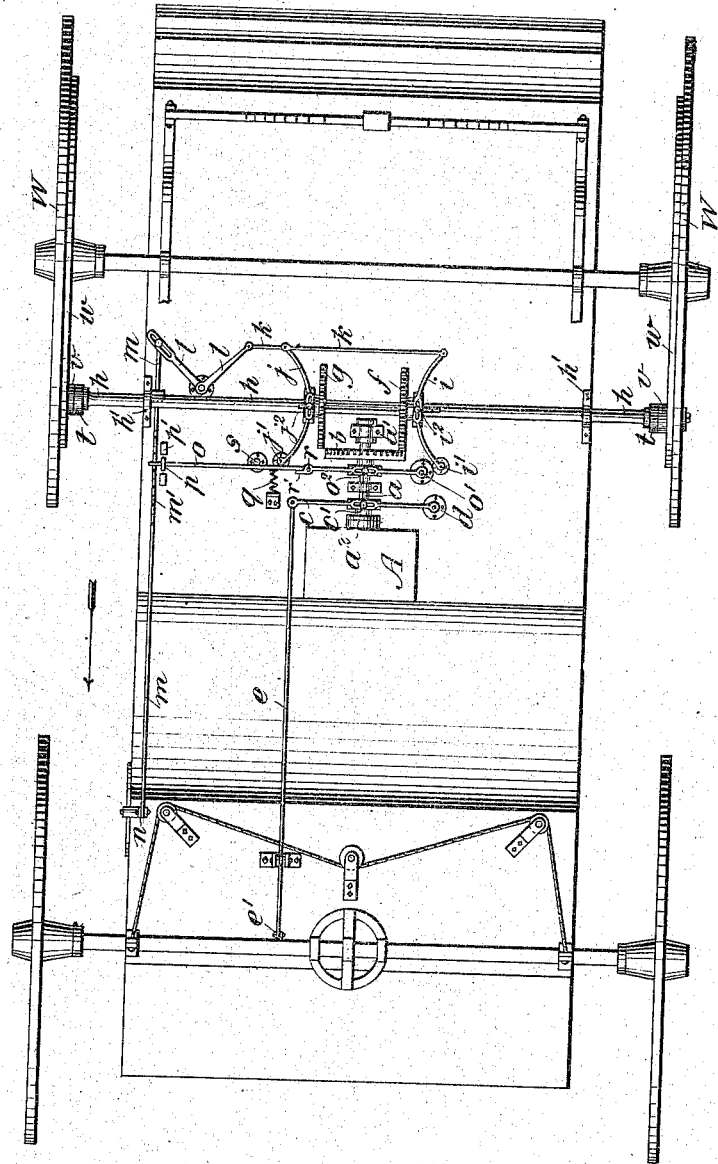
Figure 2:
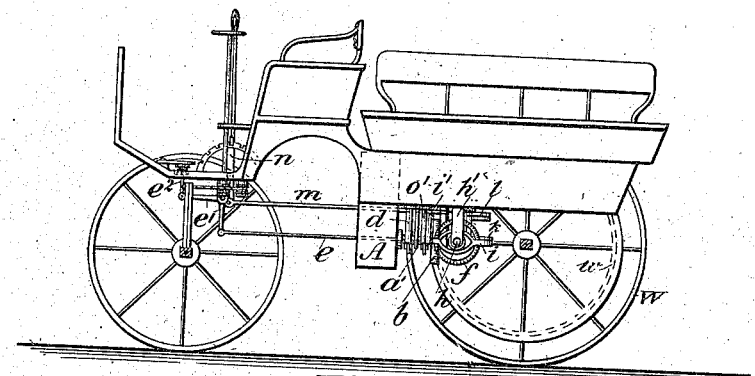
Figure 3:
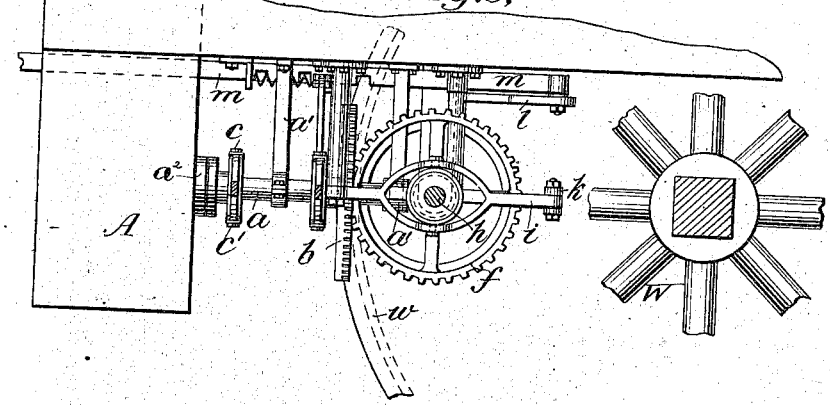
Figure 4:
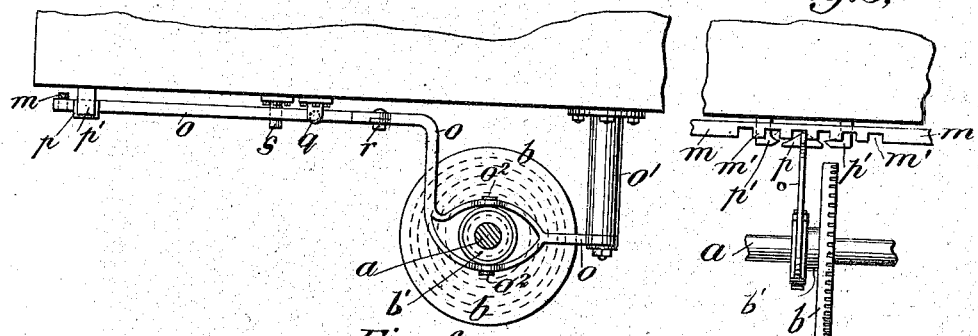
Figure 5:
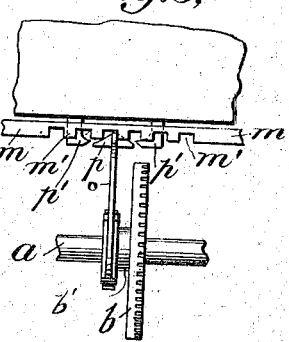

In the accompanying drawings, illustrating my invention, Figure 1 is a plan view of the bottom of the vehicle, showing the controlling mechanism in position. Fig. 2 is a side view of the vehicle. Fig. 3 is a side elevation, partly in section, of the improved gearing. Fig. 4 is an end elevation of part of the gearing, looking from the front of the vehicle. Fig. 5 is a side elevation of the same, and Fig. 6 is a detail.

The vehicle on which my improvement is used may be propelled by any suitable motive power. In the construction shown in the drawings the motive power is a naphtha-engine contained in the box A attached to the bottom of the vehicle. This engine engages with and revolves a shaft $a$ extending lengthwise of the vehicle and supported under the latter by the bearings $a'$ $a'$. On this shaft near its outer end is mounted a gear-wheel $b$ having on its face opposite the engine three sets or series of cogs or teeth $b'$, $b^2$, and $b^3$, as shown in Fig. 6. The shaft is brought into and out of engagement with the engine by means of a friction-clutch. (Shown at $a^2$.) Extending across the shaft is a rod $c$, Fig. 1, pivoted at one end to the post $d$ on the bottom of the vehicle. This rod is fastened by the pin $c'$ to a hub connected to the clutch $a^2$, so that as the rod is swung back and forth it will operate the clutch, and thus bring the shaft into and out of engagement. The free end of the rod $c$ is pivoted to one end of the rod $e$, which passes underneath the bottom of the vehicle and is connected at its other end to one arm of the bell-crank $e'$, Fig. 2, secured beneath the front end of the vehicle. The other arm of the bell-crank is connected to a vertical rod $e^2$, which passes up through the floor of the vehicle in front of the driver's seat in position to be reached by his foot, and by which the rods $e$ and $c$ are moved and the shaft $a$ brought into and out of engagement with the engine. The gear-wheel $b$ engages with and communicates its motion to the gear-wheel $f$ or $g$ mounted on the shaft $h$ at right angles to the wheel $b$. This shaft $h$ extends across the bottom of the vehicle beyond the sides of the latter, and terminates in small cog-wheels, (not shown in the drawings,) which gear into gears $w$ on the rear wheels W of the vehicle. The revolution of the wheel $b$ on the shaft $a$ is thus communicated through the wheel $f$ or $g$ and the shaft $h$ to the wheels of the vehicle, and propels the latter; and, as will be understood from Fig. 1, if the wheel $f$ on the one side of the wheel $b$ is engaged with the latter, the shaft $h$ is revolved in one direction and the wheels W are caused to turn so as to propel the vehicle forward, and if the wheel $g$ on the other side of the wheel $b$ engages with the latter the shaft $h$ is revolved in the opposite direction and the wheels W made to turn so as to propel the wheels backward. The vehicle is thus moved forward or backward as either the wheel $f$ or $g$ is made to engage with the wheel $b$. The wheels $f$ and $g$ are mounted on the shaft $h$ in such positions that only one of them can engage with the wheel $b$ at one time, and thus if the wheel $f$ is in engagement with the wheel $b$ the wheel $g$ will be out of engagement, and vice versa.

Figure 6:
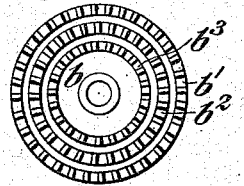

As stated above, and as shown in Fig. 6, the cog-wheel $b$ has three sets or series of teeth on its face which may engage with the cogs on either of the wheels $f$ or $g$. As will be evident, if the outer teeth $b'$ next to the rim of the wheel $b$ engage with either of the wheels $f$ or $g$ the latter wheels will be revolved at the same speed as the wheel $b$, or at the greatest speed attainable, while if the wheel $f$ or $g$ is made to engage with the inner set of teeth $b^3$ next to the hub of the wheel $b$ the revolution of the wheel $f$ or $g$ will be much less than that of the wheel $b$, and a slower speed will be obtained, and the engagement with the teeth $b^2$ will produce an intermediate rate of speed. The vehicle can thus be propelled at varying rates of speed by bringing the different sets of teeth on the wheel $b$ in engagement with the wheels $f$ or $g$.

The wheels $f$ and $g$ are brought into engagement with either of the series of teeth on the wheel $b$ by sliding the shaft $h$ on which they are mounted back and forth in its bearings $h'$.

The mechanism for moving the shaft and the wheels secured on it so the latter will engage with the wheel $b$, and thus for starting the vehicle in either direction or varying its speed, is as follows: Extending across the shaft $h$, outside of the wheels $f$ and $g$, are rods $i$ and $j$, one end of which is pivoted to the posts $i'$ and $j'$, respectively, on the bottom of the vehicle. Where these rods cross the shaft they are bifurcated so as to pass around the latter, and are there connected with a collar on the shaft by the pins $i^2$ and $j^2$, so that the movement of the rods in either direction causes a corresponding movement of the shaft. The free ends of the rods $i$ and $j$ are pivoted to the cross-rod $k$, which thus connects the rods with each other and causes them to move together. The rod $k$ is connected to one arm of the bell-crank $l$, secured to the bottom of the vehicle, the other arm of which is pivoted to the rod $m$, which passes under the bottom of the vehicle, toward the front of the latter, where it is secured to the lower end of the lever $n$. As will be understood from Fig. 1, as the bell-crank is turned by the rod $m$ the rod $k$ connected with it is moved back or forth across the vehicle and swings the free ends of the rods $i$ and $j$ in the same direction, thus sliding the shaft $h$ in its bearings and bringing the wheel $f$ or $g$ into engagement with either of the sets of teeth on the wheel $b$. Therefore by moving the lever $n$, which is conveniently placed for the hand of the driver or operator, either of the wheels $f$ or $g$ is brought into engagement with either of the sets of teeth on the wheel $b$, and thus the vehicle moved forward or backward and at any speed desired.

When the wheels $f$ or $g$ are brought into engagement with the wheel $b$, and particularly if the latter wheel is revolving, there is danger that the ends of the cogs of the respective wheels will strike each other and be damaged. To obviate this the wheel $b$ is moved back, away from the wheels $f$ and $g$ at the moment the latter are brought into position for engagement, and afterward moved forward to its former position. This back-and-forth movement of the wheel $b$, which is only momentary while the wheels $f$ and $g$ are moving, is produced by the rod $o$, pivoted at one end to the post $o'$, so as to swing on the latter, and connected by the pin $o^2$ to a collar on the hub $b'$ of the wheel $b$ back of the latter. This rod $o$ extends across the bottom of the vehicle and meets the rod $m$. The latter rod, where it is met by the rod $o$, is serrated or provided with a series of teeth $m'$, between which the rod $o$ rests and is held. On or near the end of the rod $o$ is a beveled projecting piece $p$, having sides inclined in both directions, as shown in Fig. 5, and projecting up toward the bottom of the vehicle. On the latter, and extending downward in line with the projection $p$, are two projecting pieces $p'$ $p'$ having the sides next to the piece $p$ inclined, so as to engage with the latter.

As will be evident, when the rod $m$ is moved in the direction indicated by the arrow in Fig. 1 the end of the rod $o$, held between the teeth $m'$, is moved with the latter and swung around on the post $o'$, thus sliding the hub $b'$ connected with it and moving the wheel $b$ back from the wheels $f$ and $g$; but as the end of the rod $o$ moves with the rod $m$ the beveled projection $p$ on the former strikes the incline of the fixed projection $p'$, and sliding along the latter is forced downward together with the rod $o$, and thus brings the latter rod out of engagement with the teeth $m'$ and forces it from its connection with the rod $m$. As soon as it is thus freed, the rod $o$ is swung back by the spring $q$ and slides the wheel $b$ to its former position so the wheel will engage with the wheels $f$ or $g$, and is itself sprung back into the next notch on the rod $m$, between the teeth $m'$. The position of the fixed projection $p'$ is such that the extent of the movement of the rod $o$, before the projection $p$ strikes the projection $p'$ and the rod $o$ is disconnected from the rod $m$, is just enough to move the wheel $b$ back sufficient to clear the wheels $f$ and $g$. The movement of the rod $o$ is thus very slight, and the backward and forward motion of the wheel $b$ almost instantaneous. As that part of the rod $o$ where it is connected with the hub $b'$ must always swing in the same direction to move the wheel $b$ back clear of the wheels $f$ and $g$ to cause this movement of this portion of the rod $o$ when the rod $m$, and consequently the outer end of the rod $o$, is moved in the opposite direction, the rod $o$ is jointed at $r$ and provided with a stop-hinge $r'$, as shown in Fig. 1, and between this joint or hinge and the end of the rod is a stop $s$, against which the rod rests.

As will be understood from Fig. 1, when the rod $m$ is moved in a direction opposite to that indicated by the arrow, and consequently the outer end of the rod $o$ connected with it is moved in the same direction, the rod $o$ is brought against the stop $s$ and this outer portion turned on the hinge or joint $r$, and, by reason of the stop or projection $r'$ on the hinge, the inner portion of the rod connected with the hub of the wheel $b$ is swung back in the direction to slide the wheel $b$ back from the wheels $f$ and $g$. As the end of the rod $o$ moves, the projection $p$ strikes the projection $p'$ and disconnects the rod $o$ from the rod $m$, when the rod $o$ is brought back to its former position by the spring $q$, as before described. Hence, by means of the mechanism above described, whenever either of the wheels $f$ or $g$ is brought into engagement with the wheel $b$ to cause the vehicle to move forward or backward the wheel $b$ is drawn back as the other wheels are moved, and thus any interfering of the cogs on the respective wheels prevented.

To allow the wheels W to revolve independently of each other when the vehicle is turning or backing, I place on the ends of the shaft $h$ suitably-constructed clutches $t$. By means of these clutches either wheel can move independently of the shaft and thus of each other, and the vehicle can turn without affecting the gearing.

In place of the toothed gearing shown and described a frictional gearing may be employed if desired, constructed and operating in the manner set forth above.

What I claim is—

1. In a self-propelling vehicle, in combination, the gear-wheel $b$ mounted on a shaft engaging with the motive power, gear-wheels $f$ and $g$ mounted at right angles thereto on a shaft engaging with the wheels of the vehicle, mechanism whereby one of the wheels $f$ or $g$ is brought into engagement with the wheel $b$, and other mechanism whereby the wheel $b$ is withdrawn back at the moment engagement is made with it, substantially as described.

2. In a gearing for self-propelling vehicles, the combination with the gear-wheel $b$, mounted on a shaft connected with the motive power, and arranged to engage with the gear-wheels $f$ and $g$; of the jointed rod $o$ connected to the wheel $b$, and provided at its free end with the projection $p$; and the rod $m$ having the teeth $m'$, whereby as the rod $m$ is moved in either direction the rod $o$ moves the wheel back away from the wheels $f$ and $g$ at the moment of contact with the latter, substantially as described.

3. In a self-propelling vehicle, in combination, the gear-wheel $b$ mounted on a shaft connected with the motive power, rod $o$ connected to the wheel $b$ and adapted to move the wheel back at the moment engagement is made therewith, gear-wheels $f$ and $g$ mounted on the shaft $h$ at right angles to the wheel $b$, rods $i$ and $j$ connected to the shaft $h$ whereby the shaft is slid back and forth and the wheels $f$ and $g$ brought into engagement with the wheel $b$ and mechanism for actuating the rods $o$ and $i$ and $j$ substantially as described.

Signed at New York, in the county of New York and State of New York, this 22d day of December, A. D. 1894.

RICHARD F. STEWART.

Witnesses:
 M. WILSON,
 FRED S. KEMPER.